Feb. 26, 1957
J. ROSAN
2,782,827
SNAP RING CONNECTION BETWEEN THREADED
FASTENER AND LOCKING COLLAR
Filed June 12, 1953
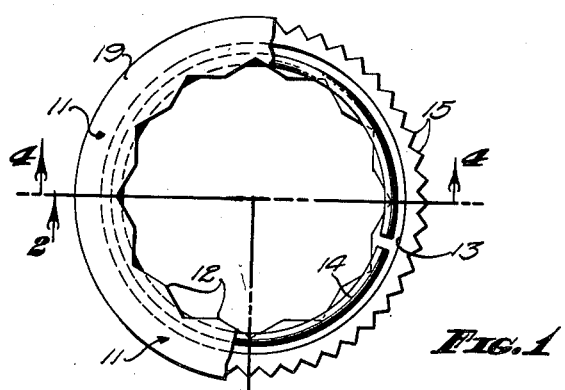
Fig.1
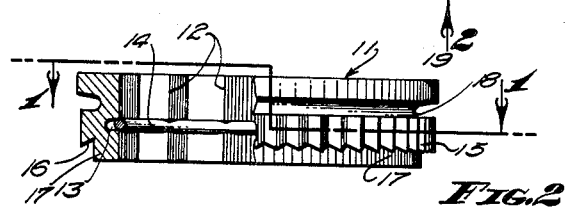
Fig.2
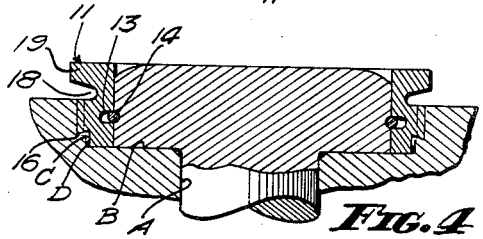
Fig.4
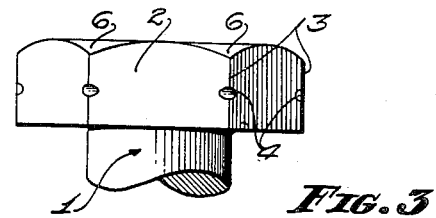
Fig.3
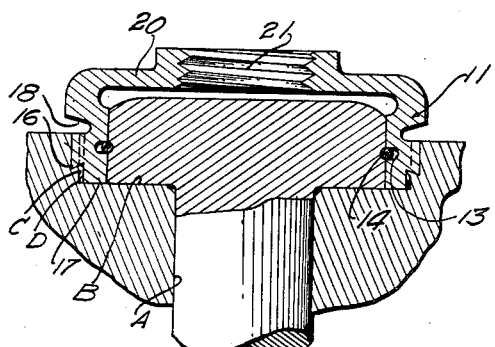
Fig.5
Fig.6
INVENTOR.
JOSEPH ROSAN
BY
Lyon & Lyon
ATTORNEYS

United States Patent Office 2,782,827
Patented Feb. 26, 1957

2,782,827

SNAP RING CONNECTION BETWEEN THREADED FASTENER AND LOCKING COLLAR

Joseph Rosan, Newport Beach, Calif.

Application June 12, 1953, Serial No. 361,149

1 Claim. (Cl. 151—41.73)

My invention relates to locking means for bolts and nuts, and included in the objects of my invention are:

First, to provide a locking means for bolts and nuts which holds a bolt or nut in place while the mating member is connected thereto or removed therefrom, and which has particular application when the nut or bolt head is not readily accessible.

Second, to provide a device of this class which may be broached into and retained by the walls of a counterbore which receive and lock a nut or bolt head against rotation or dislodgment.

Third, to provide a device of this class wherein standard bolts or nuts may be employed providing minor change is made in the bolt head or nut.

Other objects and advantages of this invention will be apparent from the following detailed description of a preferred embodiment thereof as illustrated in the accompanying drawings in which:

Figure 1 is a partial sectional, partial plan view of my locking means taken through 1—1 of Figure 2.

Figure 2 is a partial side, partial sectional view taken through 2—2 of Figure 1.

Figure 3 is a fragmentary view a bolt showing the bolt head modified for use with my locking means.

Figure 4 is a transverse sectional view through my locking means and through a bolt head seated therein with the surrounding body in which these members are seated being shown fragmentarily.

Figure 5 is a view similar to Figure 4 but showing my locking means in association with a nut.

Figure 6 is a sectional view, similar to Figure 4, showing a modified form of my locking means.

My locking means is adapted to be used with a bolt 1 having a head 2 of standard proportions and hexagonal in form. The bolt head is modified so that its apexes 3 are provided with notches 4 disposed in a common plane and forming a ring of notches. Similarly, when my locking means is used with a nut the otherwise standard nut 5 is provided at its apexes 3 with notches 4.

My locking means includes a retainer member 11 which is annular. The retainer member is provided with alternate recesses and internal flutes 12. These preferably are twelve each in number and so proportioned as to fit the hexagonal bolt head or nut in two different angular positions.

The internal flutes are intersected by an annular groove or channel 13 which is adapted to receive a split locking ring 14 in the form of a spring wire loop. The normal diameter of the locking ring is such that it is smaller than the diametrical distance between the apexes of the bolt head or nut. In other words the locking ring 14 is normally spaced from the bottom of the channel 13 and bridges the recesses between adjacent flutes 12, as shown in Fig. 1. The internal channel 13 is deep enough to permit the locking ring 14 to spring outwardly beyond the radially outermost portion of the recesses between the flutes 12 so that the retainer member 11 may be forced over the bolt head or nut until the locking ring registers with the notches 4 and snaps therein. Insertion of the bolt head or nut is facilitated by the standard beveled margin 6 with which these members are provided.

The retainer member 11 is provided with external broaching serrations 15 having undercut lower edges 16. Below the undercut edges of the serrations the retainer member 11 is provided with a pilot portion 17. Above the serrations there are formed a groove 18 and flange 19.

In the use of my locking means a bore A is provided in the body of material and is adapted to receive a bolt shank. A counterbore B is provided at at least one end of the bore A. The counterbore is of such dimensions as to receive the pilot portion 17 of the retainer member and is sufficiently smaller than the broaching serrations that these serrations broach their way into the material in order to interlock therewith against rotation.

In the arrangement shown the retainer member is inserted in the counterbore to the depth of the serrations so that the groove 18 and flange 19 project above the surrounding material so that the groove may serve as a means for prying the retaining member from the surrounding material if this is desired.

It will be observed that in the course of broaching the retaining member into place chips C will be formed which will be retained in the chip channel D formed between the pilot portion 17 and the confronting portions of the counterbore.

My locking means is used as follows:

The locking means may be forced in place in the counterbore and then the bolt head or nut forced into the retainer member, or the retainer member and bolt head or nut may be preassembled.

Reference is now directed to Figure 6. The structure here shown may be identical to the previously described structure except that the top side of the lock ring 11 is provided with an internal flange 20 overlying the bolt head. The walls of the opening of reduced diameter formed by the flange 20 are screw threaded as indicated by 21. With this arrangement a standard bolt may be screw threaded into the flange to exert an axial force on the locking ring 11, thereby to lift it free of the bolt head.

Having fully described my invention, it is to be understood that I do not wish to be limited to the details herein set forth, but my invention is of the full scope of the appended claim.

I claim:

In combination: a threaded fastening element comprising a portion of external polygonal form with an even number of sides, said portion having a circumferentially extending ring of notches in the apexes thereof; and locking means for non-rotatably but detachably securing said fastening element in a body of material having a bore and a counterbore, said locking means comprising a collar member having an internal polygonal wall provided with twelve alternating flutes and recesses adapted to mate with and receive said fastening element, the internal polygonal wall of said collar having an annular groove intersecting the flutes of said internal polygonal wall and extending to a depth beyond the radially outermost portion of said recesses sufficient to receive a split ring, and an expansible ring of circular cross-section fitting said grove and adapted to lock said fastening element against relative axial movement when said ring of notches is in planar registry with said annular groove, the exterior of said collar having a cylindrical pilot portion at one of its ends of slightly less diameter than said counterbore for guiding said collar into said counterbore and also having axially directed broaching serrations adjoining said pilot portion for interlocking engagement with the side wall of said counterbore, said collar also having a prying flange at its other end separated from said broaching serrations by a circumferentially extending groove of less diameter than the smallest diameter of said serrations adapted to be located in spaced relation to the surface of said body of material surrounding said counterbore.

References Cited in the file of this patent

UNITED STATES PATENTS

| | | |
|---|---|---|
| 689,073 | Ferguson | Dec. 17, 1901 |
| 1,432,243 | Harris | Oct. 17, 1922 |
| 1,491,163 | Osenkowski | Apr. 22, 1924 |
| 1,642,285 | Woodward | Sept. 13, 1927 |
| 1,741,077 | Rusack | Dec. 24, 1929 |
| 1,753,780 | Fisher | Apr. 8, 1930 |
| 2,021,051 | Desbrueres | Nov. 12, 1935 |
| 2,376,089 | Savageau | May 15, 1945 |
| 2,384,729 | Darby | Sept. 11, 1945 |
| 2,400,318 | Rosan | May 14, 1946 |
| 2,550,867 | Rosan | May 1, 1951 |
| 2,707,508 | Durst | May 3, 1955 |

FOREIGN PATENTS

| | | |
|---|---|---|
| 624,386 | Great Britain | June 7, 1949 |